July 5, 1949.  H. F. RYAN  2,475,054
RADIUS GRINDER FOR TOOTHED ROTARY CUTTERS
Filed April 5, 1948  2 Sheets-Sheet 1
FIG. 1.
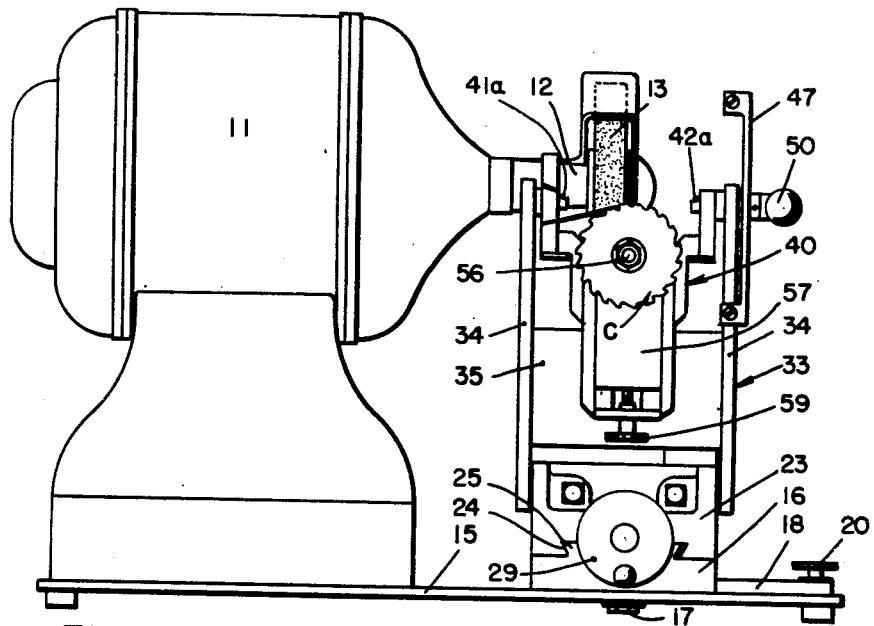
FIG. 4.  FIG. 2.
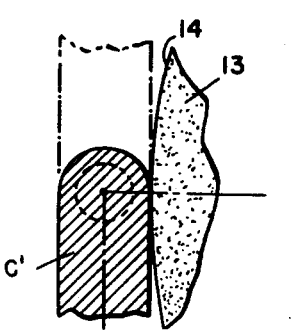
FIG. 5.
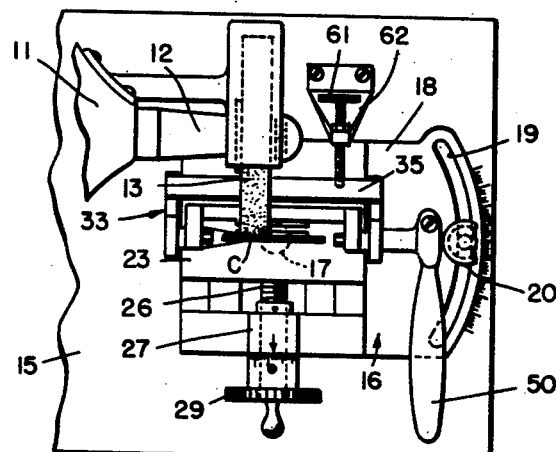
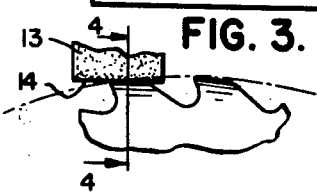
FIG. 3.
INVENTOR
HOWARD F. RYAN
BY
ATTORNEY July 5, 1949.  H. F. RYAN  2,475,054
RADIUS GRINDER FOR TOOTHED ROTARY CUTTERS
Filed April 5, 1948  2 Sheets-Sheet 2
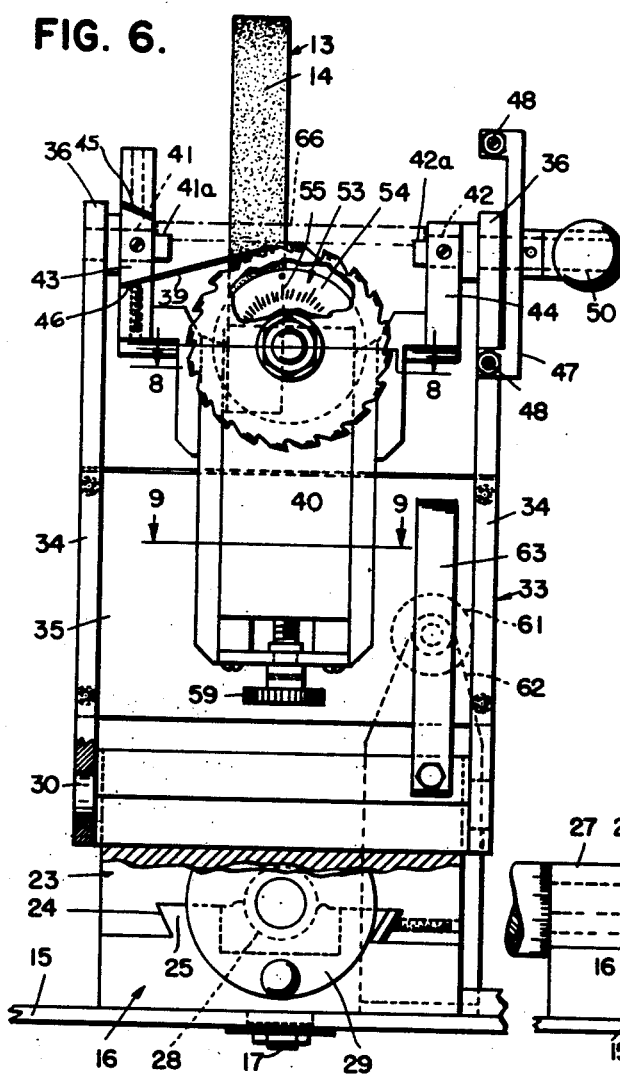
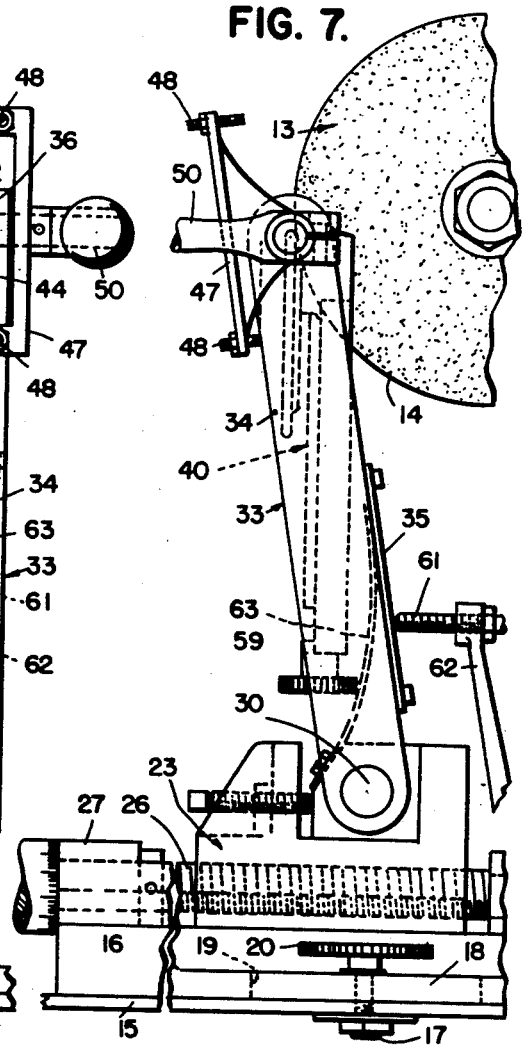
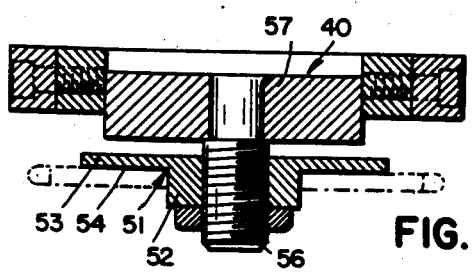
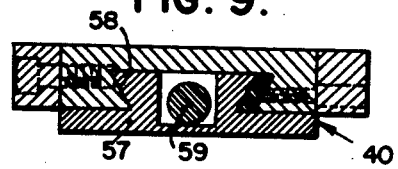
INVENTOR
HOWARD F. RYAN
BY
ATTORNEY Patented July 5, 1949

2,475,054

UNITED STATES PATENT OFFICE 2,475,054

RADIUS GRINDER FOR TOOTHED ROTARY CUTTERS

Howard F. Ryan, Long Beach, Calif.

Application April 5, 1948, Serial No. 18,955

2 Claims. (Cl. 51—96)

This invention relates to an abrading machine or grinder particularly adapted for sharpening toothed rotary cutters.

One object of the invention is to provide a simple machine for forming rounded teeth on rotary cutters. In the perforation of oil well tubing in which longitudinal slots are cut in steel pipe by means of toothed rotary cutters, it is advantageous to provide slots having rounded end walls in order to prevent the enlargement of incipient structural cracks which often start from the sharp corners at the ends of the usual rectangular-ended slots. The requirements of a machine for rounding the cutting teeth of cutters for perforating machines are not those of a high precision machine tool. The sharpening of rotary cutters in this industry is usually performed by relatively unskilled mechanics and the machines for this purpose are required to be simple to adjust and to operate. The thickness and size of the rotary cutters varies depending upon the size and thickness of the pipe which is to be perforated and adjustments must be available on the machine for readily adapting it to form and sharpen cutters of different diameters and thickness and to be readily changeable from one variety of cutter to another.

A further object is to provide a radius grinder for toothed rotary cutters which is easily and rapidly adjustable for use with cutters of different sizes. A still further object is to provide a fixture which may be used with a bench grinder for forming rounded teeth for rotary cutters used in perforating oil well pipe.

These and other objects are attained by my invention which will be understood from the following description, reference being made to the accompanying drawings in which:

Fig. 1 is a side elevational view of a preferred form of my radius grinder;

Fig. 2 is a top elevational view of the same;

Fig. 3 is a fragmentary view of a side elevation of a typical cutter tooth showing its position relative to the grinding wheel;

Fig. 4 is a diagrammatic view taken as a section on the line 4—4 of Fig. 3 showing the manner of rounding the outer cutting edge of a tooth;

Fig. 5 is a diagrammatic view similar to Fig. 4 showing an alternative positioning of the tooth and the grinding wheel to give a 180° rounded face on the cutter;

Fig. 6 is an enlarged front elevational view showing the details of the cutter fixture;

Fig. 7 is a side elevational view of Fig. 6;

Fig. 8 is an enlarged view of the mandrel mounting taken on the section 8—8 of Fig. 6;

Fig. 9 is a cross-sectional view taken on the line 9—9 of Fig. 6; and

Fig. 10 is a perspective view of a template or gauge used for positioning the mandrel.

In general, my cutter forming and sharpening machine consists of a motor driven grinding wheel mounted to operate in a vertical plane on a horizontal axis, the peripheral face of the wheel being used for abrading, and a cutter holding fixture mounted on a common base in proper and adjustable relation to the grinding wheel cutting face, this fixture consisting generally of an adjustable fastening means to hold it in operative relation to the grinding wheel, a cradle hingedly mounted on the fastening means, a mandrel-carrying block horizontally pivoted at its upper end to the upper end of the cradle, the mandrel being adjustable and arranged to hold the cutter in proper relation to the grinding face of the grinding wheel, together with means for turning the mandrel block on the upper pivots of the cradle so that the teeth of the cutter are formed by the grinding wheel with a cylindrical or conical cross section.

The motor 11 having preferably a somewhat elongated horizontal shaft 12 on which is mounted in the usual manner a grinding wheel 13 having a peripheral face 14 preferably not wider than the peripheral length of a single tooth of the cutter, mounted on a base plate 15. A mounting block 16 for the cutter holding fixture is pivotally attached by the vertical pivot pin 17 to the base plate 15 at a position substantially in alignment with the plane of the grinding wheel 13. The mounting block 16 is conveniently provided with an extension 18 having an arcuate slot 19 in which is provided a set screw 20 adapted to lock the extension 18 to the base plate 15 in any selected arcuate position. A cradle base 23 is slidably mounted on the dovetailed tongue 25 on the top surface of the mounting block 16 by means of the dove-tail slots 24. The relative endwise position of the cradle base 23 and the mounting block 16 is adjustable by means of the screw 26 whose unthreaded end is rotatable in the bearing 27 on the mounting block 16, and whose threads engage the threaded boss 28 extending downwardly from the cradle base 23, the screw 26 being conveniently operated by a hand wheel 29. The cradle base 23 is provided with horizontal pivots 30 upon which is pivotally mounted a cradle 33. A tooth rest 39 in the form of a spring steel strip may be inserted in one or the other slots 45 or 46 provided in the face of the bracket 43, to hold the cutter against rotation during the grinding.

The cradle 33 consists of a pair of spaced-apart upwardly-extending arms 34 held together as an assembly by the back plate 35, each of the arms being provided at the top with pivot bearings arranged with their axes in a horizontal position, the mandrel-carrying block 40 being pivoted thereon to swing between the arms. The mandrel-carrying block 40 is provided with pivot shafts 41 and 42 extending horizontally from brackets 43 and 44 respectively, attached to said block, the pivot shafts 41 and 42 having their axes aligned and in a horizontal position, and adapted to be held in the pivot bearings 36 in the arms 34 of the cradle 33. A stop lever 47 is attached at its middle to the shaft 42 adjacent one arm 34 of the cradle, this stop lever being provided with adjustable stop screws at its two ends arranged to abut the sides of one arm 34 to stop the turning of the shaft 42 and the cradle attached thereto at the ends of a pre-determined arc. A handle 50 is also attached to the outer end of the shaft 42 to facilitate the turning of the shaft and the attached mandrel-carrying block 40.

The mandrel 51 upon which a cutter C is adapted to be mounted consists of a hub 52 adapted to fit in the axial opening of the cutter, and a flange 53 extending from the lower end of this hub 52, the upper face 54 of the flange being provided with indices 55 showing the angular position of the hub and hence the elevation of the face of the flange. The hub 52 and its flange 53 are threadedly mounted on the stud bolt 56 which is fixedly mounted on the slide 57, this slide being mounted in dove-tailed grooves in the mandrel-carrying block 40, a micrometer adjusting screw 59 being provided at the lower end of said block 40 for adjusting the relative position of the mandrel hub to the axis of rotation of the pivot shafts 41 and 42. The inclination of the cradle 33 toward the grinding wheel face 14 is limited by the adjustable hand screw 61 mounted in the post 62 fixed to the base plate 15, and a flat spring 63 mounted on the cradle base 23 and having its free end pressing against the front side of the back plate 35 is provided to hold the cradle 33 against the end of said adjustable hand screw 61.

The inner ends of the pivot shafts 41 and 42 are each provided with a land arranged parallel to the common axis of said shafts and also arranged at right angles to the axis of the mandrel. Special gauges or templates 66 corresponding to different thickness of cutters, as shown particularly in Fig. 10, are adapted to be placed on these lands 67 to fix the periphery of the cutter after the cutter teeth have been rounded.

The use of my tooth sharpening device will be understood from the above description of its structural arrangement. The cutter whose teeth are to be sharpened to give rounded slot ends when used for slotting is mounted on the hub 52 of the mandrel 51, the flange face 54 of the flange 53 upon which the cutter face rests being raised or lowered on the stud bolt 56 to correspond to the thickness of the particular cutter being sharpened. The indices 55 of the flange 53 may be used to indicate this elevation of the face of the flange adapted to compensate for the varying standard thicknesses of the cutters. After the cutter is positioned on the hub 52 so that the median plane of the cutter coincides or is parallel to the common axis of the pivot shafts 41 and 42, the desired position of the axis of the mandrel or the periphery of the cutter is adjusted by means of the micrometer screw 59 to a selected position relative to the axial line of the shafts 41 and 42. This is conveniently measured by means of one of the special templates or gauges 66 (Fig. 10) which is placed upon the lands 67 to determine the proper height of the mandrel-carrying block 40. The cross-sectional shape of the teeth may be varied from substantially a 180° cylindrical curvature having a diameter equal to the thickness of the cutter, as shown in Fig. 5, to a slightly rounded cutting edge as shown in Fig. 4, by changing the relative inclination of the cradle 33 by means of the handscrew 61. The curved surface of each tooth may be cylindrical and tangent to the periphery of the cutter or it may be conical, thereby giving a relief area back of the cutting edge. The inclination of this conical surface may be regulated by adjusting the angular setting of the mounting block 16 by means of the screw 20 acting in the arcuate slot 19 of the extension 18.

The advantages of my grinding machine will be apparent. The several adjustment means permit a large amount of variation in the contours of the rounded cutter tooth which may be formed or sharpened on the machine. Having once adjusted the machine, the teeth of each cutter may be formed uniformly and with precision relative to the periphery of the cutter, thus insuring sharp cuts with a minimum of cutting resistance and chatter. The device is relatively inexpensive, is simple to operate, and is also easily and quickly adjusted for use with cutters of different sizes and thicknesses.

I claim:

1. In a radius grinder for toothed rotary cutters, a base plate; a grinding wheel with rotary means mounted upon said base plate, said wheel having a peripheral abrading face; and a cutter holding fixture, said fixture comprising a mounting block vertically pivoted on said base plate, including means for fixing said block at any selected angle; a cradle-base slidably attached to said mounting block including micrometer screw means for horizontally positioning said cradle-base, the top of said cradle-base being provided with a pair of pivots extending horizontally therefrom and adapted for hingedly supporting a cradle; a cradle horizontally pivoted at its lower end on said pivots, said cradle including a pair of parallel side arms extending upwardly from said cradle-base, said arms each having horizontal pivot means near its upper end adapted to hold a mandrel-carrying block; a mandrel-carrying block pivotally mounted for movement on a horizontal axis to said arms of said cradle, including a mandrel for a toothed rotary cutter, with means for movement of said mandrel toward and away from the axis of said pivot means on said mandrel-carrying block and also having means for movement of said mandrel parallel to its axis; handle means for manually swinging said mandrel-carrying block on said pivot means at the upper end of said cradle arms; adjustable stop means for limiting the inclination of said cradle in the direction toward the peripheral face of said grinding wheel; spring means to hold said cradle against said stop means; and means for limiting the arc of rotation of said mandrel-carrying block on the said horizontal pivot means at the upper ends of said cradle arms.

2. A cutter holding fixture for a radius grinder comprising a mounting block vertically pivotable on its base, including means for fixing said block at any selected angle; a cradle-base slidably attached to said mounting block including micrometer screw means for horizontally positioing said cradle-base, the top of said cradle-base being provided with a pair of pivots extending horizontally therefrom and adapted for hingedly supporting a cradle; a cradle horizontally pivoted at its lower end on said pivots, said cradle including a pair of parallel side arms extending upwardly from said cradle-base, said arms each having horizontal pivot means near its upper end adapted to hold a mandrel-carrying block; a mandrel-carrying block pivotally mounted for movement on a horizontal axis to said arms of said cradle, including a mandrel for a toothed rotary cutter, with means for movement of said mandrel toward and away from the axis of said pivot means on said mandrel-carrying block and also having means for movement of said mandrel parallel to its axis; handle means for manually swinging said mandrel-carrying block on said pivot means at the upper end of said cradle arms; adjustable stop means for limiting the inclination of said cradle in the direction toward the peripheral face of said grinding wheel; spring means to hold said cradle against said stop means; and means for limiting the arc of rotation of said mandrel-carrying block on the said horizontal pivot means at the upper ends of said cradle arms.

HOWARD F. RYAN.

REFERENCES CITED

The following references are of record in the file of this patent:

UNITED STATES PATENTS

| Number | Name | Date |
|---|---|---|
| 481,259 | Feicker | Aug. 23, 1892 |
| 1,679,413 | Einstein et al. | Aug. 7, 1928 |
| 1,987,832 | Knight | Jan. 15, 1935 |